United States Patent [19]
Fujimoto

[11] Patent Number: 6,107,723
[45] Date of Patent: Aug. 22, 2000

[54] VIBRATING TYPE DRIVING DEVICE

[75] Inventor: Kosuke Fujimoto, Higashi Murayama, Japan

[73] Assignee: Canon Kabushiki Kaisha, Tokyo, Japan

[21] Appl. No.: 08/997,814

[22] Filed: Dec. 24, 1997

[30] Foreign Application Priority Data

Dec. 26, 1996 [JP] Japan ..................................... 8-348569
Dec. 27, 1996 [JP] Japan ..................................... 8-350418

[51] Int. Cl.$^7$ .................................................. H01L 41/08
[52] U.S. Cl. .................................. 310/323.09; 310/323.08
[58] Field of Search ........................... 310/323.08, 323.09

[56] References Cited

U.S. PATENT DOCUMENTS

| | | | |
|---|---|---|---|
| 5,164,629 | 11/1992 | Nakanishi | 310/323 |
| 5,352,950 | 10/1994 | Shirasaki | 310/323 |
| 5,406,160 | 4/1995 | Shirasaki | 310/323 |
| 5,463,265 | 10/1995 | Kitani et al. | 310/323 |
| 5,684,353 | 11/1997 | Fujimoto et al. | 310/323 |
| 5,739,623 | 4/1998 | Kanazawa et al. | 310/323 |
| 5,760,529 | 6/1998 | Tamai et al. | 310/323 |
| 5,798,598 | 8/1998 | Fujimoto | 310/323 |
| 5,854,529 | 12/1998 | Ashizawa et al. | 310/323 |

FOREIGN PATENT DOCUMENTS 63-73887  4/1988  Japan ................. 310/323.09

*Primary Examiner*—Clayton LaBalle
*Attorney, Agent, or Firm*—Fitzpatrick, Cella, Harper & Scinto

[57] ABSTRACT

A vibrating type driving device is constructed by a vibration member in which a vibration is excited, a moving member which is come into contact with the vibration member and is rotated, an output shaft which is coupled to the moving member and is rotated, pressurizing means for making the vibration member and the moving member come into pressure contact with each other, and a plurality of bearings which are separately arranged in an axial direction for rotatably supporting the output shaft, wherein the plurality of bearings are arranged so as to separately receive a reactive force of pressure applied by the pressurizing means.

14 Claims, 12 Drawing Sheets

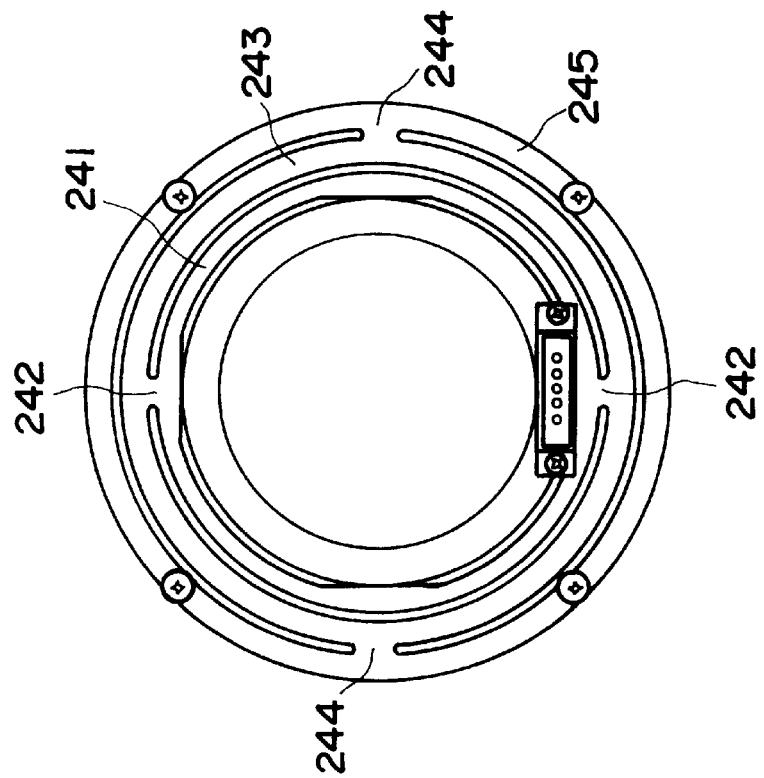
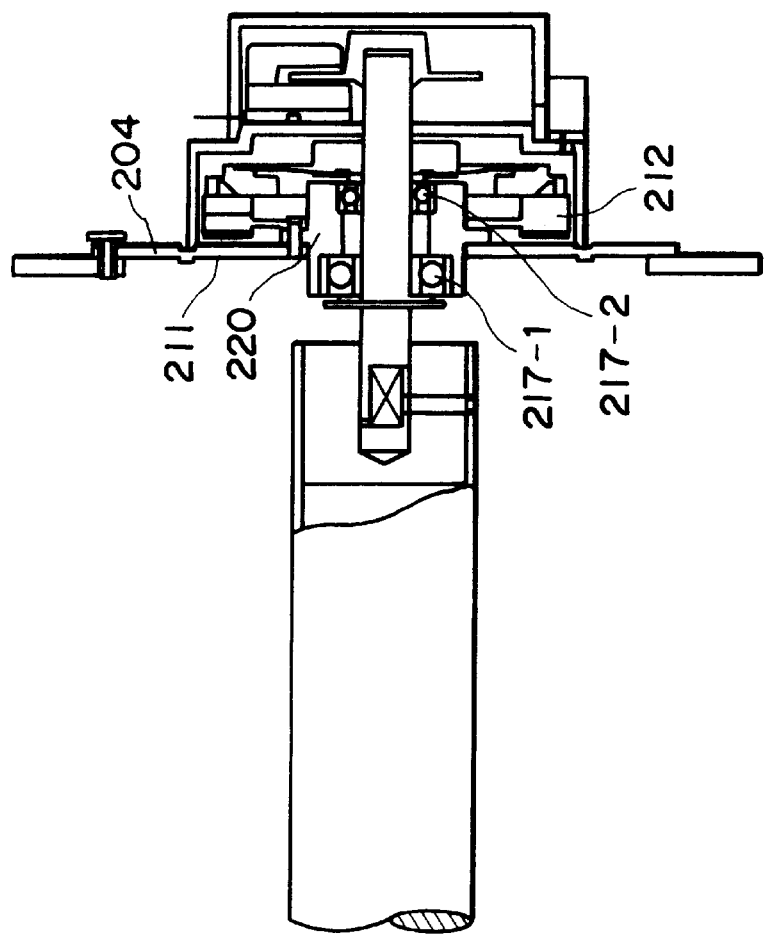
FIG. 9B
FIG. 9A

VIBRATING TYPE DRIVING DEVICE

BACKGROUND OF THE INVENTION

1. Field of the Invention

The invention relates to a vibrating type driving device for obtaining a driving force by press contacting a moving member against a vibration member.

2. Related Background Art

In a vibrating type driving device (vibrating type motor), a moving member is brought into pressure contact with a vibration member made of an elastic member to which an electromechanical energy converting element is joined; an AC voltage is applied to the converting element, and a progressive vibration wave thereby is generated in the vibration member, thereby frictionally driving the moving member.

FIG. 7 shows a conventional vibrating type motor. A ring-shaped stator (vibration member) 102 fixed to a base 101 is constructed in a manner such that an electromechanical energy converting element 122 to which a current is supplied through a connector 110 and a flexible board 111 is joined to the lower surface of an elastic member 121 and a frictional member 123 is adhered onto the upper surface of the elastic member 121. An outer peripheral portion of a pressurizing spring 106 is attached onto the upper surface of a rotor (moving member) 103 through a rubber plate 107. An inner peripheral portion of the pressurizing spring 106 is attached to a disk 105 which is shrink fitted to an output shaft 104.

The output shaft 104 is rotatably supported by a pair of roller bearings 181 and 182 each having an outer ring fixed to the base 101 and an inner ring fitted to the outer circumference of the output shaft 104. The disk 105 is in contact with the inner ring of the rolling bearing 182. On the other hand, the inner ring of the rolling bearing 181 is brought into engagement with a snap ring 109 attached to a groove of the output shaft 104 in a state in which the output shaft 104 is pressed onto the stator 102 side together with the disk 105 and the inner ring of the roller bearing 182 by only a displacement amount of the pressurizing spring 106, thereby bringing the rotor 103 into pressure contact with the stator 102 with a proper force.

As shown in FIG. 6, consequently, in the bearing 182, a preload force acting in the same direction as that of a pressure of the pressurizing spring 106 is applied to the inner ring by the disk 105, so that a rattle in the radial direction in the bearing 182 is eliminated. On the other hand, in the bearing 181, a preload force acting in the direction opposite to that of the pressure of the pressurizing spring 106 is applied to the inner ring by the snap ring 109, so that a rattle in the radial direction in the bearing 181 is eliminated. Since the rattle in the radial direction of each of the bearings 181 and 182 is eliminated, a shake in the radial direction of the output shaft 104 is also suppressed.

Now, assuming that a reactive force of pressure of the pressurizing spring 106 is labeled as F and a preload force of the bearing 181 is labeled P1 and a preload force of the bearing 182 is called P2, the relation $$F = P1 - P2$$

is satisfied among those three forces.

As will be understood from the above relation, since the bearing 181 receives the sum of the reactive force of pressure and the preload force of the bearing 182 as a preload force, such a preload force is much larger than the preload force of the bearing 182.

Usually, a fatigue life of the bearing is inversely proportional to the cube of the bearing load. Therefore, a fatigue life of the bearing 181 which receives a large preload force is much shorter than that of the bearing 182. Further, since the vibrating type motor is often used at a low speed and it is difficult to form an oil film between the rolling member of the bearing and a raceway surface, it is necessary to set a load of a rolling member of the bearing to be smaller than the ordinary load.

A torque which can be generated by a motor depends on the maximum frictional force between the stator and the rotor. Since the frictional force is determined by a coefficient of friction between the rotor and the stator, and a pressure applied therebetween, it is effective to increase the pressure in order to raise the maximum torque.

In the conventional motor, however, since the bearing 181 bears all of the pressure, in order to increase the pressure without reducing the bearing life, a bearing having a larger load rating has to be used. This results in an increase in size and cost of the bearing.

In recent years, in the fields of OA equipment and FA equipment, high precision is demanded in the positioning of a driving mechanism, the speed control, and the like. A general way to reduce a rotational output of a pulse motor or the like is to use a speed reducing mechanism such as gear, belt, or the like and to perform driving at high resolution and high torque. When the speed reducing mechanism uses gear, however, transfer precision may deteriorate due to a tooth shape error, a pitch circle error, or the like. In order to raise the degree of precision, it is necessary to raise the gear grade, perform a precision grinding, or the like, which results in high costs. Further, since controllability deteriorates due to nonlinearity caused by backlash, it is necessary to provide a countermeasure, such as a non-backlash gear or the like. When the speed reducing mechanism uses a belt, the controllability also deteriorates because of a reduction in transfer precision due to eccentricity, roundness, or the like of a pulley, expansion and contraction of the belt, and reduction of the transfer rigidity due to a bending vibration.

On the other hand, a "direct drive" method, in which a motor shaft is directly attached to a driven member and is driven using a motor which can generate a low speed and a high torque without using a speed reducing mechanism such as a gear, belt, or the like, is an effective drive means. In this "direct drive" method, reduction of the precision using the above transfer mechanism, backlash, and reduction of the rigidity in the transfer system can be prevented and the motor shaft can be driven at high precision.

Since a vibration wave motor can stably generate torque at a low speed, it is a motor suitable for the "direct drive" method. The vibration wave motor is constructed in a manner such that an electromechanical energy converting element (piezoelectric element, magnetostrictive element, or the like) is joined to one side of a vibration member made of an elastic material, an AC voltage is applied to such a piezoelectric element, and a progressive vibration wave is generated in the vibration member, thereby frictionally driving the moving member that is in contact with the vibration member with a pressure. By combining angle detecting means of a high resolution to such a motor, the motor shaft can be driven at high precision, high rigidity, and high resolution.

FIGS. 15A and 15B show conventional examples of a roller driving device which is used to convey a sheet.

One end of a roller is rotatably supported at a casing of the device by a ball bearing and another end is fixed to an output shaft of a motor fixed to the device. With such a structure, the transfer error occurring in the conventional case of reducing the speed by using a gear or belt driving can be eliminated.

In the case of performing a gear or belt driving method, even if a slight error occurs in an attaching precision between the member to be driven and the transfer mechanism, it can be absorbed by the transfer mechanism. For example, although a change in distance between the shafts occurring when the eccentricity of the gear causes deterioration of the transfer precision, since the displacement of the gear is absorbed between the gears, a surplus load that is caused by an error of each transfer member is not applied to the driven member or the motor. In the case of belt driving as well, since each part precision and an attaching error are converted to a linear velocity of the belt or are absorbed by the extension and contraction of the belt, the load to be applied to the motor is small.

However, in the case of performing a "direct drive" method or in the case where at least one end of the rotary shaft of the driven member is supported by a bearing, since the motor shaft is supported at three points of two bearings in the motor and one bearing of the driven member, there is no location where an inclination of a coupling portion of the motor shaft and the driven member or an axial deviation is absorbed. Therefore, a large load is given to each bearing, the bearing life is reduced, precision due to increase in radial oscillation deteriorates, and the torque of the motor is reduced due to the load.

For example, FIG. 15A shows a state in which a deep groove ball bearing 5' in which a proper preload is applied is arranged at an edge of a roller 2' serving as a member to be driven on the side opposite to the side where a motor 11 is coupled.

A construction of the motor 1' will now be described. In a stator 12' fixed to a base 11' with screws, a piezoelectric element is fixedly attached to the back surface of a vibration member using an elastic material such as metal or the like and a frictional material is adhered to another surface thereof. A rotor 13' is brought into pressure contact with the stator 12' by a pressurizing spring 16' whose bore is fixed to a disk 15' which is shrink fitted to a rotary shaft 14'. The rotary shaft of the rotor 13' is rotatably supported by a pair of deep groove ball bearings 17'-1 and 17'-2 in each of which an outer ring is fixed to a base. The rotor 13' is supported at an inner ring of the bearing 17'-1 by a snap ring 18' attached to a groove of the rotary shaft in a state where the rotary shaft is pushed onto the stator side by only a pressurizing displacement amount of a pressurizing spring for making the rotor come into pressure contact with the stator with a proper force. The bearing 17'-2 eliminates a rattle by applying a proper preload force to the inner ring by the disk 15' and suppresses a radial oscillation of the rotary shaft, thereby guaranteeing a precision of a built-in encoder 6'.

By supplying a driving voltage to the piezoelectric element through a connector flexible board 19', a progressive vibration wave is generated in the stator, and the rotor that is in pressure contact with the stator is driven, thereby taking out the rotation from the rotary shaft.

In the coupling between the motor and the roller, the rotary shaft 14' is inserted with a light pressure into a hole 24' formed in the roller and is fixed by a set screw 25' set from the lateral direction.

In this example, since a preload force is applied to all of the three bearings, the rattle of each bearing is eliminated and a high rigidity can be provided in both the radial and thrust directions.

When an inclination between the roller and the motor shaft occurs in the coupling portion of the roller and the motor, the displacement at the time of rotation has to be absorbed by a deformation of any one of the three bearings or any one of the coupling portion, the motor shaft, and the roller.

This deformation becomes a large load for the driving by the motor, causing deterioration of a stop precision or a speed controllability. Further, since a large radial load occurs in each bearing, the bearing life deteriorates.

When the motor shaft swings and rotates, the pressurizing spring also swings and rotates, so that the pressure with which the rotor 13' is brought into contact with the stator 12' also changes together with the rotation. Thus, a constant torque is not generated.

FIG. 15B shows a state where the motor is fixed to a casing of the driven device using a mount 7' made of rubber in consideration of the above point. When a bending force is applied to the motor, the mount is deformed and absorbs the displacement, so that a surplus load is not applied to the bearings of the motor and the roller. In this case, however, the mount is also deformed in the torsional direction (roller rotating direction) and is rotated and deformed together with the motor casing. In a motor having an angle detecting mechanism (rotary encoder) as shown by the encoder 6', although a rotational displacement due to the torsional deformation of the mount is not detected from the encoder, since an angular displacement occurs in the roller, the encoder cannot accurately detect the angular displacement of the roller.

Further, since a torsional rigidity of the motor casing is low for the load torque, a response speed decreases and the controllability deteriorates.

Although the above example has been described with respect to the "direct drive" method, even in the case where the device has speed reducing and transfer means, a similar problem also occurs in the case of raising the transfer precision and the rigidity by eliminating backlash, using a steel belt having high rigidity, or the like. Therefore, the above problem is not limited to the "direct drive" method.

As mentioned above, in order to improve the precision, it is necessary to fix the motor casing with high rigidity for torsion. Moreover, in the case of using the "direct drive" method or a transfer system of high rigidity, it is necessary that the motor casing is flexibly supported for any error that is caused by a working tolerance or an assembling tolerance.

SUMMARY OF THE INVENTION

According to one aspect of the invention, there is provided a vibrating type driving device in which a reactive force that is caused when a moving member is brought into pressure contact with a vibration member preloads each of a plurality of bearings through an output shaft, thereby extending the bearing life and eliminating rattle.

The above and other objects and features of the present invention will become apparent from the following detailed description and the appended claims with reference to the accompanying drawings.

BRIEF DESCRIPTION OF THE DRAWINGS

FIGS. 8A and 8B show the fifth embodiment of a device using a vibration wave motor of the invention as a driving source, in which FIG. 8A is a cross sectional view and FIG. 8B is a side elevational view of FIG. 8A;

FIGS. 9A and 9B show the sixth embodiment of a device using a vibration wave motor of the invention as a driving source, in which FIG. 9A is a cross sectional view and FIG. 9B is a side elevational view of FIG. 9A;

FIGS. 11A and 11B show the eighth embodiment of a device using a vibration wave motor of the invention as a driving source, in which FIG. 11A is a cross sectional view and FIG. 11B is a side elevational view and a plan view of a fixing member of FIG. 11A;

FIGS. 12A and 12B show the ninth embodiment of the invention, in which FIG. 12A is a perspective view and FIG. 12B is a side elevational view;

DETAILED DESCRIPTION OF THE PREFERRED EMBODIMENTS (First embodiment)

Figure 1:
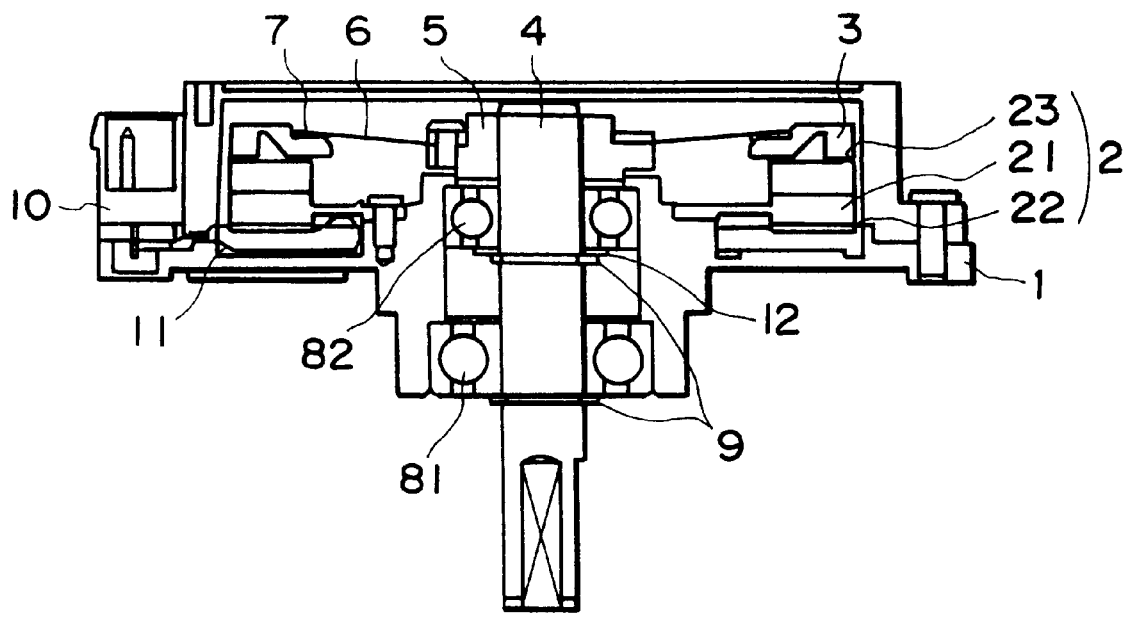
FIG. 1 is a cross sectional view of a vibrating type driving device according to the first embodiment of the invention.

FIG. 1 shows a vibrating type driving device according to the first embodiment of the invention. A ring-shaped stator (vibration member) 2 which is made of metal and is fixed to a base 1 is constructed in a manner such that an electromechanical energy converting element 22 to which a current is supplied through a connector 10 and a flexible circuit board 11 is joined to the lower surface of an elastic member 21 and a frictional member 23 is adhered onto the upper surface of the elastic member 21. An outer peripheral portion of a pressurizing spring 6 is attached onto the upper surface of a rotor (moving member) 3 through a rubber plate 7. An inner peripheral portion of the pressurizing spring 6 is attached to a disk 5 which is shrink fitted to an output shaft 4.

The output shaft 4 is rotatably supported by a pair of deep groove ball bearings (rolling bearings) 81 and 82 each having an outer ring fixed to the base 1 and an inner ring fitted to the outer circumference of the output shaft 4.

The inner ring of each of the bearings 81 and 82 is brought into engagement with each snap ring 9 attached to a groove in the output shaft 4 formed on the lower side of each of the bearings 81 and 82 in a state in which the disk 5 and output shaft 4 are pressed onto the stator 2 side by only a displacement amount of the pressurizing spring 6 for making the rotor 3 come into pressure contact with the stator 2 with a proper force. Thus, the output shaft 4 and the inner ring of each of the bearings 81 and 82 can integrally move in the operating direction of a reactive force of pressure from the pressurizing spring 6 to the output shaft 4. The disk 5 is separated from the inner ring and the outer ring of the bearing 82.

A wave washer 12 is interposed between the inner ring of the bearing 82 and the snap ring 9 which is brought into engagement therewith. An elastic deformation amount of the wave washer 12 is set to a value in which a reactive force component in the case where the reactive force of pressure is proportionally distributed at a ratio of the load ratings of the bearings 81 and 82 acts on the inner ring of the bearing 82.

As mentioned above, by making the reactive force of pressure act on the inner ring of each of the bearings 81 and 82 through the output shaft 4 and snap ring 9, the reactive force component which each bearing bears is used as a preload in each of the bearings 81 and 82. Since rattle in the radial direction of each of the bearings 81 and 82 is eliminated, shake in the radial direction of the output shaft 4 is also suppressed.

Figure 5:
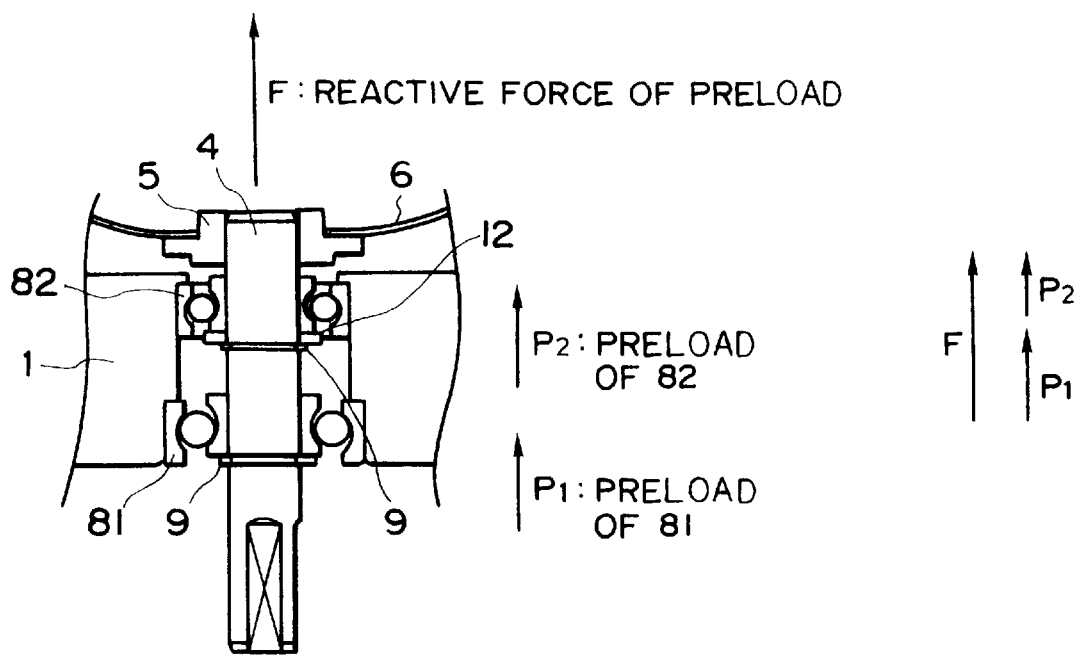
FIG. 5 is a diagram of a bearing portion in the first embodiment.
Figure 6:
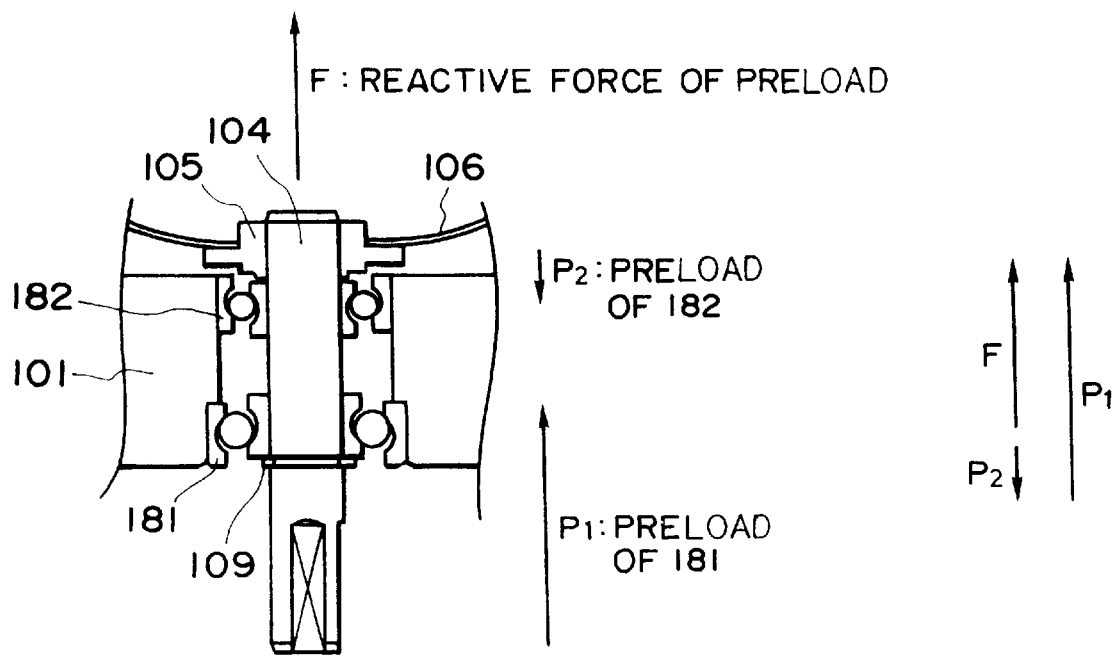
FIG. 6 is a diagram of a bearing portion in a conventional vibrating type driving device.
Figure 7:
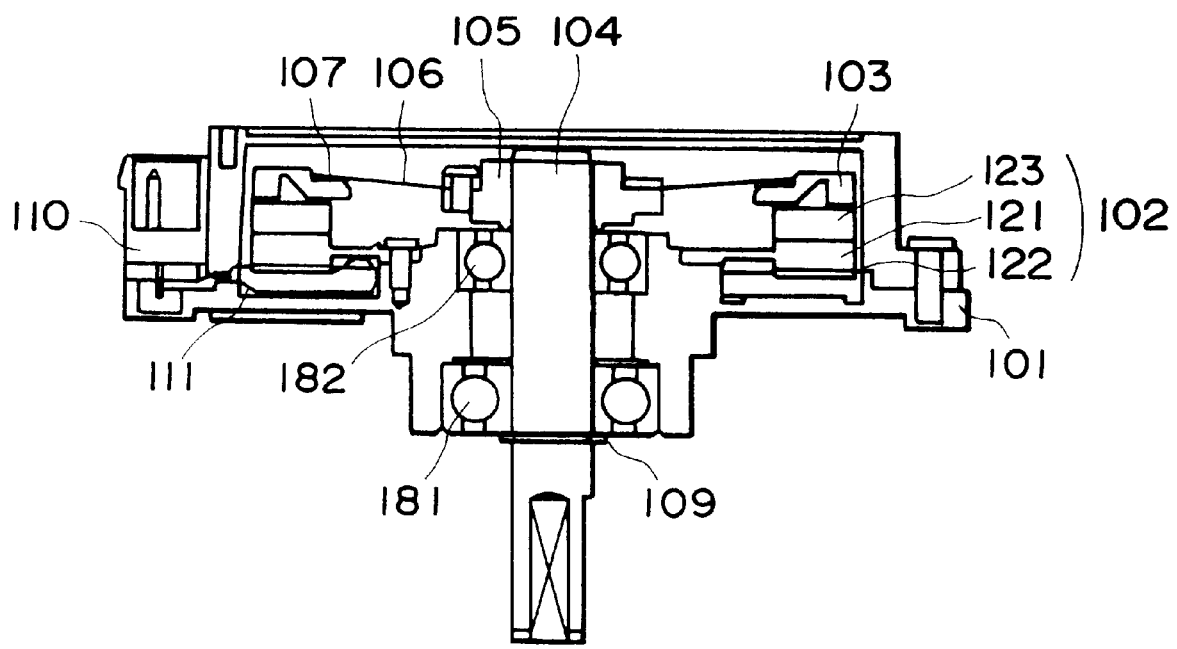
FIG. 7 is a cross sectional view of a conventional vibrating type driving device.

The relation between the preloads of the bearings 81 and 82 will now be described in detail with reference to FIG. 5. FIG. 5 schematically shows the bearings 81 and 82.

The reactive force F of pressure acts on the output shaft 4 as an upward force. The reactive force F of pressure is borne by the two bearings 81 and 82. The preloads of the bearings 81 and 82 are set to P1 and P2, respectively.

The preload P2 is equal to the spring force for an elastic deformation amount of the wave washer 12 which is determined by a difference between movement amounts in the axial direction of the inner rings of the bearings 81 and 82 at the time of pressurizing, a relative position of the outer rings, and an interval between the two snap rings 9 provided for the output shaft 4.

Since the directions of the preloads P1 and P2 of the bearings 81 and 82 are equal and are the same as the direction of the reactive force F of pressure, the preload P1 of the bearing 81 is equal to a value obtained by subtracting the preload P2 of the bearing 82 from a magnitude of the reactive force of pressure. Consequently, the reactive force F of pressure can be distributed as preloads to the two bearings 81 and 82.

It is known by experimentation that the fatigue life of a ball bearing is expressed by the following expression:

$$L \alpha (C/P)^3$$

where L: life

C: fundamental dynamic load rating of the bearing

P: bearing load

In the case where a plurality of bearings are used, since the shortest bearing life becomes the life of the driving device, by setting a condition such that the life of each bearing becomes almost the same life, a long life of the driving device can be realized. For this purpose, it will be understood from the above expression that it is sufficient to proportionally distribute the reactive force F of pressure at a ratio of the load ratings of the bearings 81 and 82 so that ratios of the load ratings C of the bearings 81 and 82 and the bearing load P are equalized and to set the distributed reactive forces to the bearing loads (preloads).

In the present embodiment, it is sufficient to decide the interval between the snap rings 9 and the positions of the outer rings of the bearings so as to give the elastic deformation amount of the wave washer 12 for generating the bearing loads obtained by proportionally distributing the reactive force F of pressure.

When the bearings are at rest or are rotating at an extremely low speed, if a contact surface pressure between the raceway surface of each bearing and the rolling member is large, a permanent deformation occurs in the raceway surface and the rolling member, so that there is a fear that the bearings cannot be used.

To prevent such a problem, it is desirable that the reactive force of pressure is proportionally distributed at a ratio of the load ratings of the bearings and are set to the bearing loads, respectively, in a manner such that a safety factor f which is expressed by a ratio $$f=C_o/P_o$$

between a fundamental static load rating $C_o$ of the bearing and a static load $P_o$ to the bearing is equalized.

Strictly speaking, since the contact surface pressure between the raceway surface and the rolling member is not proportional to the bearing load, it is also possible to distribute the bearing load so that the contact surface pressure between the raceway surface and the rolling member is equal for each bearing.

(Second embodiment)

Figure 2:
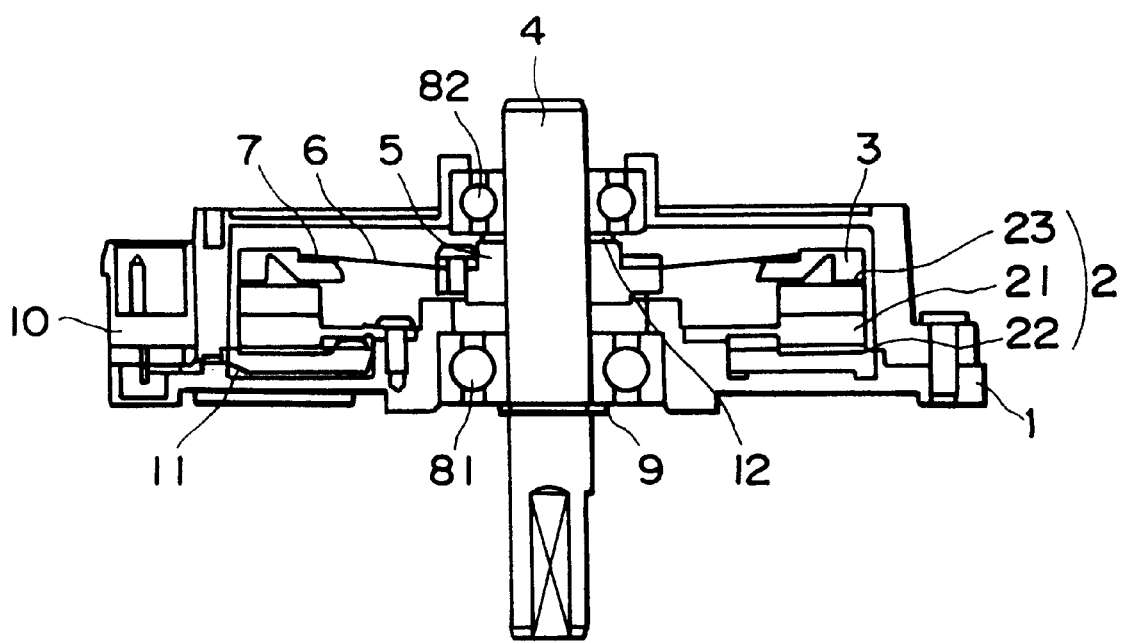
FIG. 2 is a cross sectional view of a vibrating type driving device according to the second embodiment of the invention.

FIG. 2 shows a vibrating type driving device according to the second embodiment of the invention. The ring-shaped stator (vibration member) 2 which is made of metal and is fixed to the base 1 is constructed in a manner such that the electromechanical energy converting element 22 to which a current is supplied through the connector 10 and flexible circuit board 11 is joined to the lower surface of the elastic member 21 and the frictional member 23 is adhered onto the upper surface of the elastic member 21. An outer peripheral portion of the pressurizing spring 6 is attached onto the upper surface of the rotor (moving member) 3 through the rubber plate 7. An inner peripheral portion of the pressurizing spring 6 is attached to the disk 5, which is shrink fitted to the output shaft 4.

The output shaft 4 is rotatably supported by a pair of deep groove ball bearings (rolling bearings) 81 and 82 each having an outer ring fixed to the position in the base 1 where the pressurizing spring 6 and disk 5 are sandwiched and an inner ring fitted to the outer circumference of the output shaft 4.

The inner ring of the bearing 81 is brought into engagement with the snap ring 9 attached to a groove in the output shaft 4 formed on the lower side of the bearing 81 in a state in which the disk 5 and output shaft 4 are pressed onto the stator 2 side by only a displacement amount of the pressurizing spring 6 for making the rotor 3 come into pressure contact with the stator 2 with a proper force. The inner ring of the bearing 82 is in contact with the upper surface of the disk 5 so as to sandwich the wave washer 12. Thus, the output shaft 4 and the inner ring of each of the bearings 81 and 82 can integrally move in the operating direction of a reactive force of pressure from the pressurizing spring 6 to the output shaft 4.

An elastic deformation amount of the wave washer 12 is set to a value in which a reactive force component in the case where the reactive force of pressure is proportionally distributed at a ratio of the load ratings of the bearings 81 and 82 acts on the inner ring of the bearing 82.

In the present embodiment as well, preloads acting in the same direction which were obtained by proportionally distributing the reactive force of pressure at the ratio of the load ratings are applied to the two bearings 81 and 82, thereby allowing the bearings 81 and 82 to uniformly bear the reactive force of pressure. A long life of the driving device can be realized.

By arranging the two bearings 81 and 82 at positions where the pressurizing spring 6 and disk 5 (namely, the rotor 3 and stator 2) are sandwiched, the distance between the bearings can be increased and the rigidity of the output shaft 4 for the radial load can be enlarged.

(Third embodiment)

Figure 3:
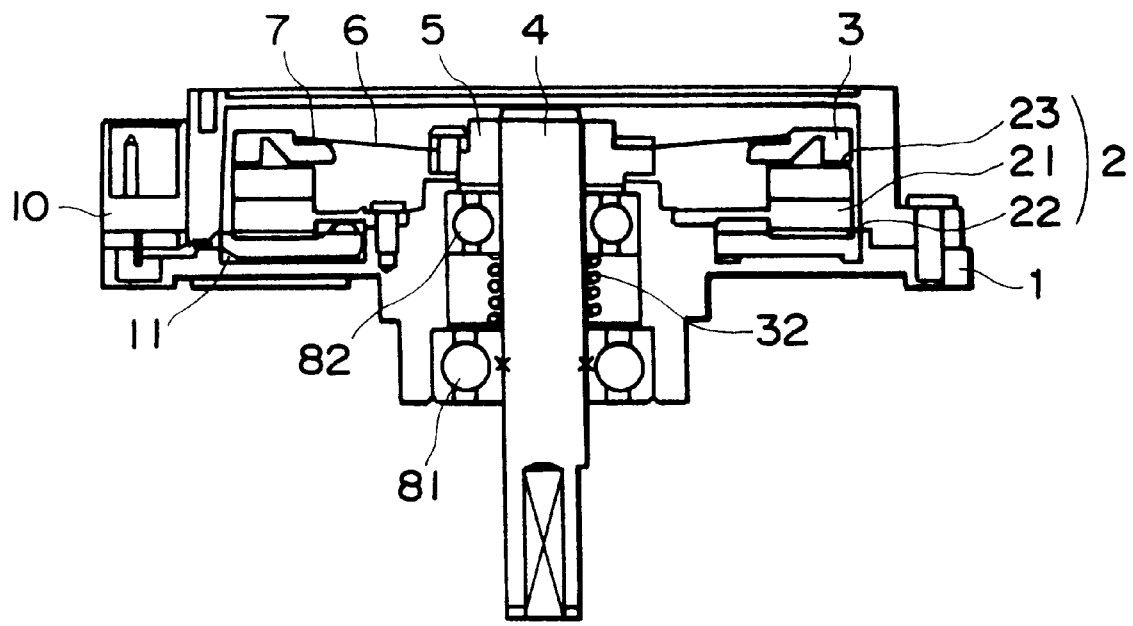
FIG. 3 is a cross sectional view of a vibrating type driving device according to the third embodiment of the invention.

FIG. 3 shows a vibrating type driving device according to the third embodiment of the invention. The ring-shaped stator (vibration member) 2 which is made of metal and is fixed to the base 1 is constructed in a manner such that the electromechanical energy converting element 22 to which a current is supplied through the connector 10 and flexible circuit board 11 is joined to the lower surface of the elastic member 21 and the frictional member 23 is adhered onto the upper surface of the elastic member 21. An outer peripheral portion of the pressurizing spring 6 is attached onto the upper surface of the rotor (moving member) 3 through the rubber plate 7. An inner peripheral portion of the pressurizing spring 6 is attached to the disk 5, which is shrink fitted to the output shaft 4.

The output shaft 4 is rotatably supported by a pair of deep groove ball bearings (rolling bearings) 81 and 82 each having an outer ring fixed to the position in the base 1 and an inner ring fitted to the outer circumference of the output shaft 4.

The inner ring of the bearing 81 is attached to the outer circumference of the output shaft 4 in a state in which the disk 5 and output shaft 4 are pressed onto the stator 2 side by only a displacement amount of the pressurizing spring 6 for making the rotor 3 come into pressure contact with the stator 2 with a proper force. A compression coil spring 32 is sandwiched between the inner ring of the bearing 81 and the inner ring of the bearing 82 in a state where it is compressed by a predetermined amount. A compression amount of the compression coil spring 32 is set to a value in which a reactive force component in the case where the reactive force of pressure is proportionally distributed at a ratio of the load ratings of the bearings 81 and 82 acts on the inner ring of the bearing 82.

In the present embodiment as well, preloads acting in the same direction which were obtained by proportionally distributing the reactive force of pressure at the ratio of the load ratings are applied to the two bearings 81 and 82, thereby allowing the bearings 81 and 82 to uniformly bear the reactive force of pressure. A long life of the driving device can be realized.

In the present embodiment, since both edges of the compression spring 32 are supported by the inner rings of the bearings and the inner ring of one of the bearings is adhered to the outer shaft 4, a long life can be cheaply realized without working a groove or the like adapted to fit the snap ring onto the output shaft 4.

(Fourth embodiment)

Figure 4:
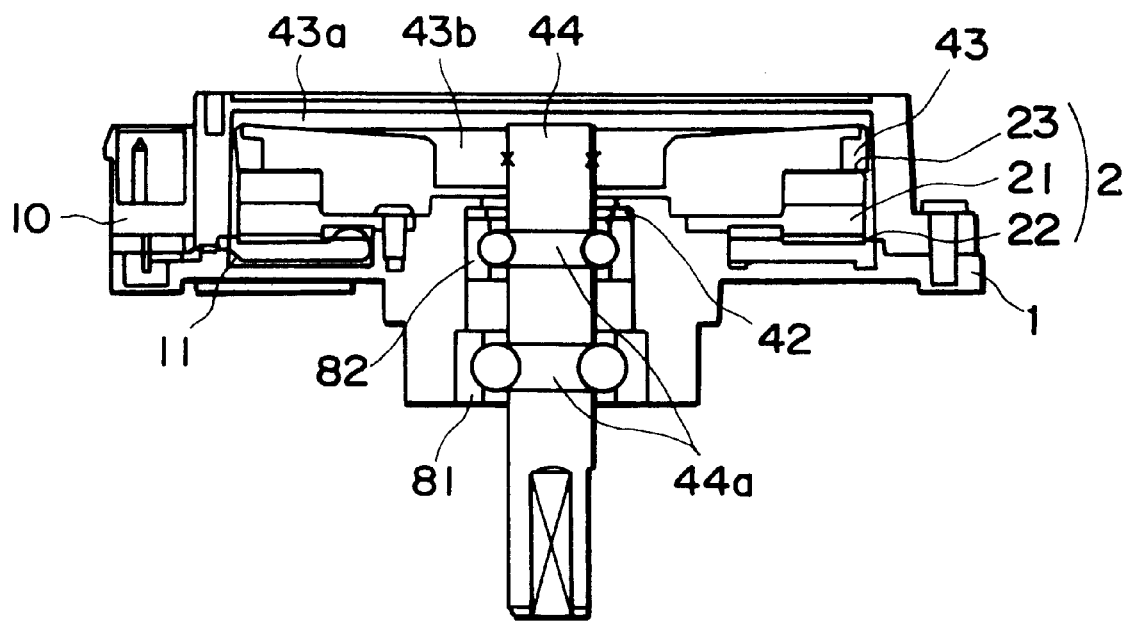
FIG. 4 is a cross sectional view of a vibrating type driving device according to the fourth embodiment of the invention.

FIG. 4 shows a vibrating type driving device according to the fourth embodiment of the invention. The ring-shaped stator (vibration member) 2 which is made of metal and is fixed to the base 1 is constructed in a manner such that the electromechanical energy converting element 22 to which a current is supplied through the connector 10 and flexible circuit board 11 is joined to the lower surface of the elastic member 21 and the frictional member 23 is adhered onto the upper surface of the elastic member 21. The rotor (moving member) 43 integrally includes a pressurizing spring portion 43a and a disk portion 43b. The disk portion 43b of the rotor 43 is adhered to an output shaft 44 in a state where it is pressed by a displacement amount at which a proper pressure is obtained after the output shaft 44 was inserted from the downward position of the base 1.

The output shaft 44 is rotatably supported by a pair of bearings (rolling bearings) 81 and 82 each of which has a rolling member which rolls in a raceway groove 44a formed on the outer circumference of the output shaft 44 and is formed integrally with the output shaft 44. The outer ring of the bearing 81 is fixed to the base 1. The outer ring of the bearing 82 is held to the base 1 through a compression spring 42. The outer ring of the bearing 82 is depressed by the compression spring 42 onto the base 1.

A compression amount of the compression spring 42 is set to a value in which a reactive force component in the case where the reactive force of pressure of the pressurizing spring portion 43a is proportionally distributed at a ratio of the load ratings of the bearings 81 and 82 acts on the inner ring of the bearing 82.

In the present embodiment as well, preloads acting in the same direction which were obtained by proportionally distributing the reactive force of pressure at the ratio of the load ratings are applied to the two bearings 81 and 82, thereby allowing the bearings 81 and 82 to uniformly bear the reactive force of pressure. A long life of the driving device can be realized.

In the present embodiment, since the number of parts is small and, further, shake of the output shaft due to an engaging rattle between the bearing having the bearing inner ring and the output shaft is also small, a cheap and long-life driving device having high assembling performance can be realized.

According to the embodiment as described above, the reactive force of pressure for making the moving member come into pressure contact with the vibration member is distributed to a plurality of bearings, the bearings are allowed to bear the reactive force of pressure, and the distributed reactive forces are used as a preload of each bearing. Thus, a small size and a long life of each bearing can be accomplished and a compact vibrating type driving device of a long life can be realized.

If the burden of each bearing is proportionally distributed at the ratio of the load ratings of the bearings or is distributed so as to equalize the contact surface pressure between the bearing raceway surface and the rolling member, further long lives of the bearing and vibrating type driving device can be realized.

(Fifth embodiment)

Figure 8B:
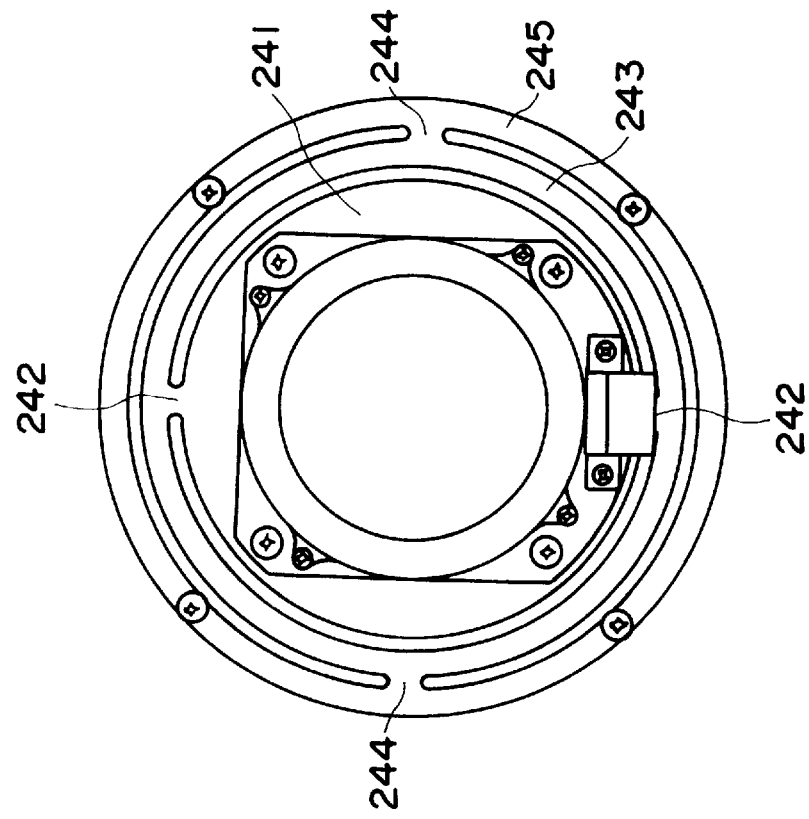
Figure 8A:
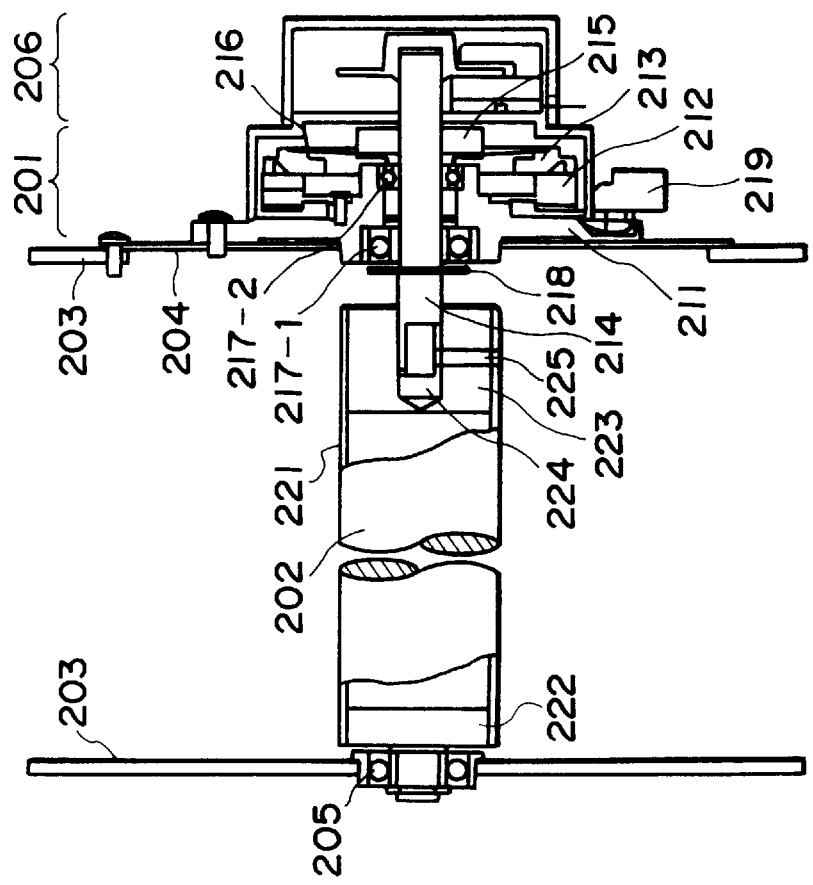

FIGS. 8A and 8B show the fifth embodiment of the invention.

Reference numeral 201 denotes a vibration wave motor; 202 a roller serving as a member to be driven; and 203 a casing side plate of the device to be driven. A construction of the vibration wave motor 201 in the embodiment will now be described. As for a stator 212 fixed to a base 211 with screws, a piezoelectric element is fixedly adhered to the back surface of a vibration member made of an elastic material such as metal or the like and a frictional material is adhered to another surface of the stator 212. A rotor 213 serving as a moving member is in pressure contact with the stator 212 by a pressurizing spring 216 whose bore is fixed to a disk 215 which is shrink fitted to a rotary shaft 214. A rotary shaft of the rotor 213 is rotatably supported by a pair of deep groove ball bearings 217-1 and 217-2 whose outer rings are fixed to the base and is supported at an inner ring of the bearing 217-1 by a snap ring 218 attached to a groove on the rotary shaft in a state where the rotary shaft is pressed onto the stator side by only a pressurizing displacement amount of a pressurizing spring to make the rotor come into pressure contact with the stator with a proper force. A rattle of the bearing 217-2 is eliminated by applying a proper preload to the inner ring of the bearing 217-2 by the disk 215.

By supplying a driving voltage such as an alternating signal to the piezoelectric element serving as an electromechanical energy converting element through a connector flexible circuit board 219, a progressive vibration wave is caused in the stator. By driving the rotor which is in pressure contact with the stator, the rotation is taken out from the rotary shaft.

The roller 202 is constructed by a pipe-shaped roller main body 221 and flanges 222 and 223 which are inserted with a pressure fit into or are shrink fitted into both edges of the roller 202. A bearing 205 is arranged in the flange 222, thereby rotatably supporting the flange 222 at the side plate 203 of the device casing. A hole 224 into which the rotary shaft of the motor is inserted and a set screw 225 are formed in the flange 223.

By fixing the motor 201 to the device and by fixing the rotary shaft 214 to the flange 223, the roller can be directly driven integrally with the rotary shaft of the motor.

The motor 201 has a fixing member 204 and is fixed to the side plate of the device casing with screws through the fixing member 204.

The fixing member 204 is made of a thin plate of metal and includes: an intermediate portion 243 coupled by a pair of hinge portions 242 which face from a motor fixing portion 241 in the vertical direction around the motor rotary shaft as a center; and another pair of hinge portions 244 which face at positions which are deviated by 90° from the hinge portions 242 from the intermediate portion around the motor rotary shaft as a center. The fixing member 204 is coupled to a device fixing portion 245.

The motor fixing portion 241 has a tap hole to fix the motor. The base 211 of the motor is fixed into the tap hole. The device fixing portion 245 has a fixing hole and is fixed to the device side plate 203 with screws.

A function of the fixing member 204 in the embodiment of the invention will now be described.

In FIG. 8B, when a bending moment in which the longitudinal direction in the paper surface is labeled as a rotational axis is applied, torsion occurs in the hinge portions 242, so that only the motor fixing portion is inclined. When a bending moment in which the lateral direction in the paper surface is labeled as a rotational axis is applied, since torsion occurs in the hinge portions 244, so that the motor fixing portion 241 and intermediate portion 243 are inclined.

When the bending moment in which the direction perpendicular to the paper surface is labeled as a rotational axis is applied, torsion occurs in the surface of the thin plate and the rotary shaft has a large rigidity, so that a torsional deformation is very small.

Owing to the above function, the fixing member 204 restricts the motion of the motor in the rotating direction of the motor and can be resiliently supported for inclination (bending).

According to the embodiment as mentioned above, by using the fixing member made by the thin plate, the load on each part which is caused by the working tolerance or assembling tolerance is absorbed by the inclination of the motor, the deformation of each part and the bending moment to the motor shaft are reduced, and a "direct drive" method of high precision, high rigidity, and high controllability can be realized.

(Sixth embodiment)

FIGS. 9A and 9B show the sixth embodiment of the invention.

The outer rings of the bearings 217-1 and 217-2 are fixed to a bearing housing 220. The bearing housing 220 is fixed with screws to the base 211 obtained by press-working a metal plate together with the stator 212. The base 211 has a fixing member 204 at the outer circumference. The fixing member 204 includes an intermediate portion 243 connected by a pair of hinge portions 242 which face from the motor fixing portion 241 in the vertical direction around the motor rotary shaft as a center; and another pair of hinge portions 244 which face from the intermediate portion so as to be deviated from the hinge portions 242 by 90° around the motor rotary shaft as a center. The fixing member 204 is coupled to a device fixing portion 245. The device fixing portion 245 has holes for fixing and is fixed to the device side plate with screws.

The base 211 has an engaging portion for a motor casing and also acts as a rib and can eliminate deformation of the fixing member 204 at the outer circumference. Therefore, in the inside portion, the base 211 functions as a base of the motor.

With the construction of the present embodiment, there are advantages such that the motor can be easily assembled into the device and can be further miniaturized.

(Seventh embodiment)

Figure 10:
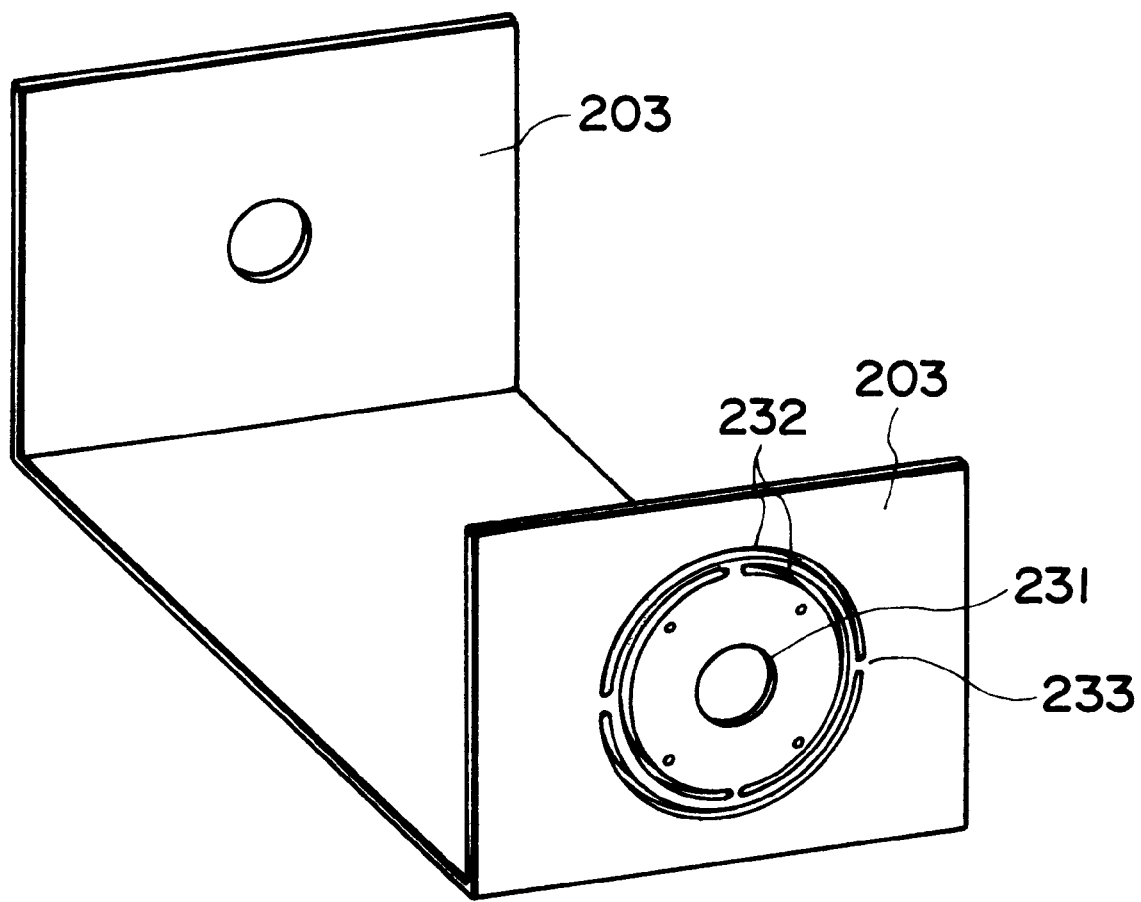
FIG. 10 is a perspective view of the seventh embodiment of the invention.

FIG. 10 shows the seventh embodiment of the invention.

According to the present embodiment, by forming a motor engaging hole 231 through the side plate 203 of the device to be driven and by forming arc-shaped holes 232 through the outer circumference of the motor engaging hole 231, two pairs of hinge portions 233 which are mutually deviated by 90° and shown in the foregoing fourth and fifth embodiments are formed. By fixing the motor casing to a position on the inner side of the arc-shaped holes with screws or the like, the motor is restricted in the rotating direction and can be resiliently supported for inclination.

According to the present embodiment, since the positioning engaging hole of the motor can be formed in the side plate, the structure provides the advantages of high precision and a small number of required parts.

(Eighth embodiment)

Figure 11B:
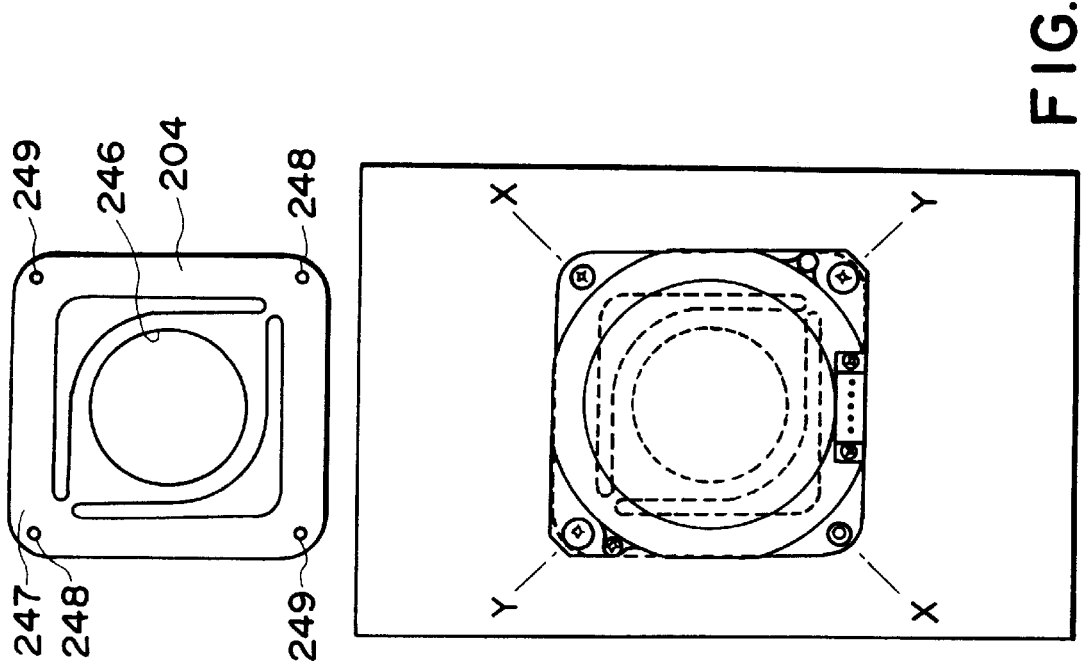
Figure 11A:
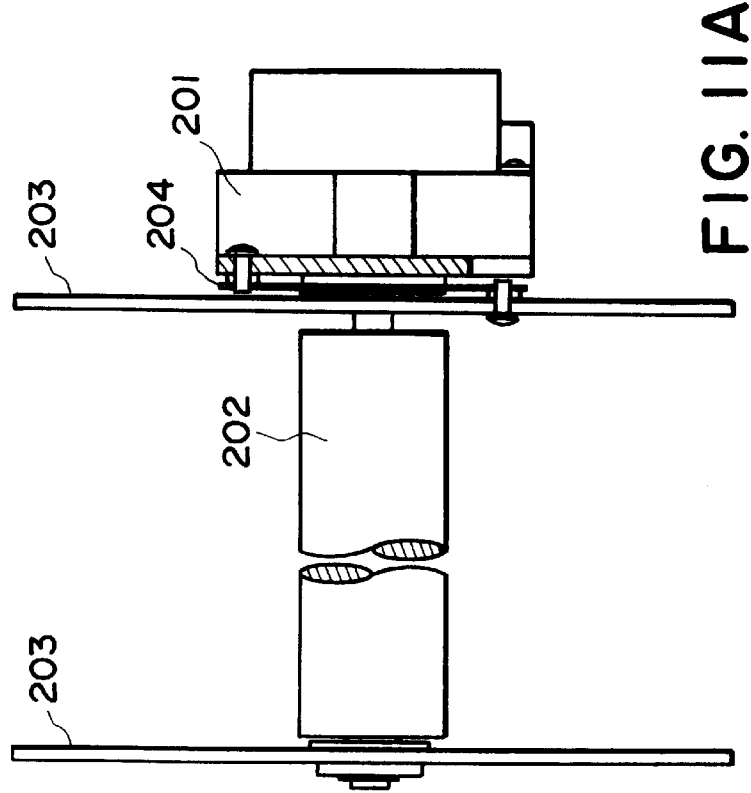

FIGS. 11A and 11B show the eighth embodiment of the invention.

Reference numeral 201 denotes the vibration wave motor; 202 the roller serving as a member to be driven; and 203 the casing side plate of the device to be driven. The motor 201 has a fixing member 204 and is fixed to the device casing side plate with screws extending through the fixing member 204.

The fixing member 204 in the present embodiment is made of a thin plate of metal and has an engaging portion 246 adapted to fit the motor to the inside. A quadrangular spring portion 247 is provided on the outside of the fixing member 204 and is coupled to the motor engaging portion at a pair of opposing vertexes. Two tap holes 248 for fixing the motor are formed at positions near the vertexes. Tap holes 249 for fixing the device are formed at another pair of opposing vertexes.

A function of the fixing member 204 in the present embodiment will now be described.

When a bending moment in which a center line X is labeled as a rotational axis is applied, since a bending deformation occurs in the spring portion, only the motor is inclined. The same shall also similarly apply to the case where a bending moment in which a center line Y is labeled as a rotational axis. By synthesizing those two deformation forces, the motor can be resiliently inclined for all of the bending moments having rotational axes in the paper surface. As for the torsion around the motor rotary shaft as a center, it becomes the torsion in the surface of the thin plate and the motor rotary shaft has a large rigidity, so that the torsional deformation is very small.

Although the torsion of the hinge portions has been used in the foregoing fourth to sixth embodiments, since the bending of four beams is used in each embodiment, a stress occurring in the spring portion is small and a degree of freedom of the design is high.

(Ninth embodiment)

Figure 12B:
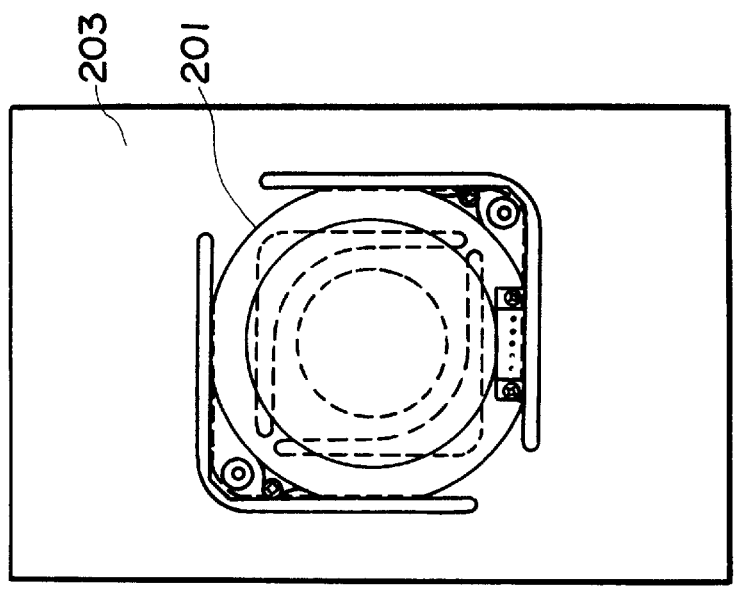
Figure 12A:
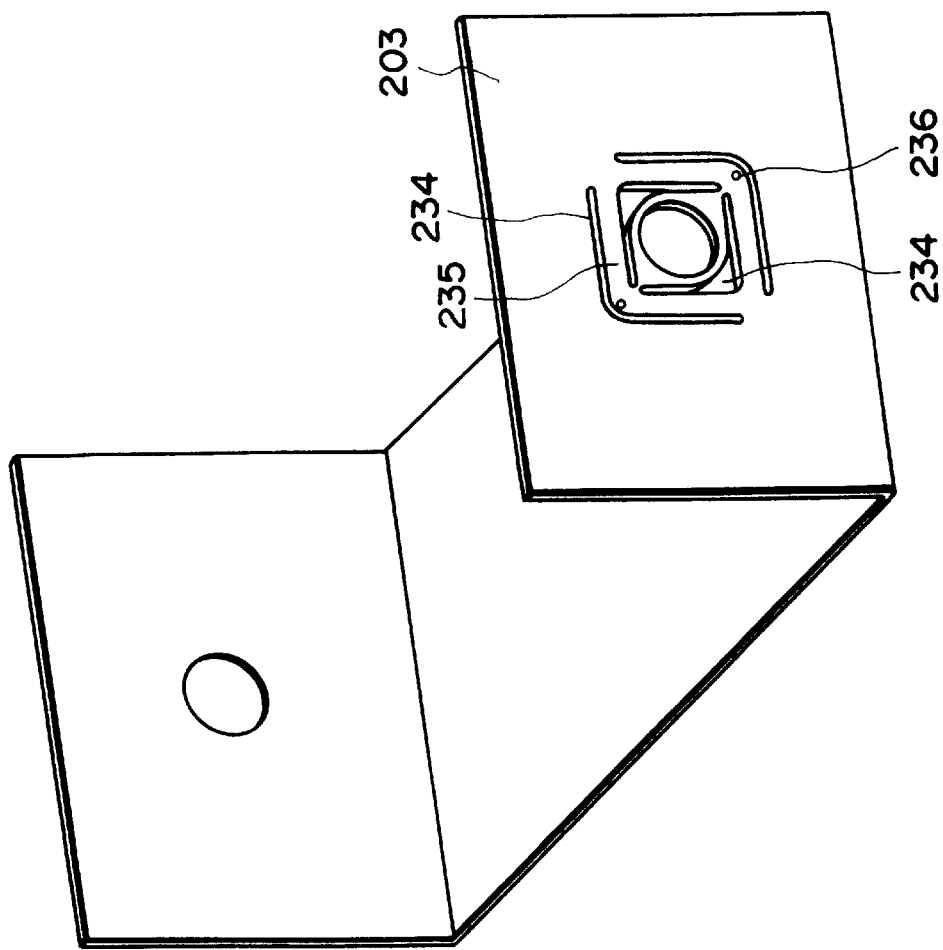

FIGS. 12A and 12B show the ninth embodiment.

The ninth embodiment is a modification of the foregoing eighth embodiment. Four L-shaped holes 234 are formed through the device side plate 203, four beams are formed on the side plate, and the motor is fixed by motor fixing tap holes 236 formed at two opposing vertexes. That is, the function of the fixing member of the foregoing eighth embodiment is provided for the device side plate.

As compared with the foregoing seventh embodiment, since the bending of the beams is used, a generating stress is small. Even in case of a steel plate of a small limit stress which is ordinarily used as a material of the device casing, a design of a high degree of freedom can be performed.

The roller in each of the above embodiments can be applied to a variety of fields. For example, it can be applied to a platen roller of a printer, a transfer roller or a charging roller of a copying apparatus, pressing and heating rollers of a fixing device, or the like. The invention is not limited to only the roller but, for example, a photosensitive drum or the like of the copying device also can be used as a member to be driven.

Figure 13A:
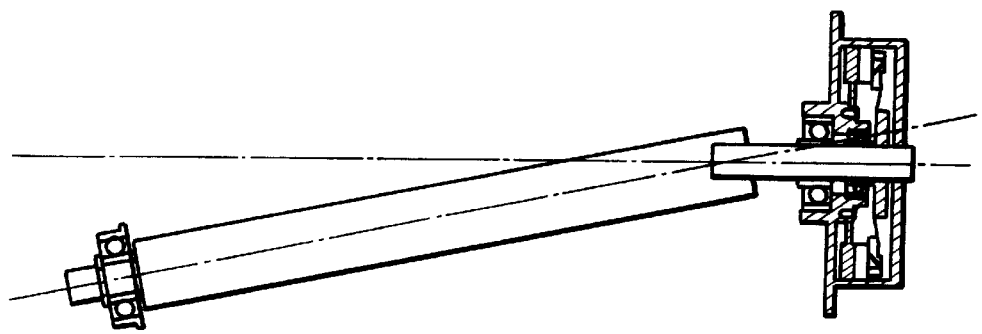
FIGS. 13A, 13B, and 13C are cross sectional views for explaining an effect of the invention.
Figure 13B:
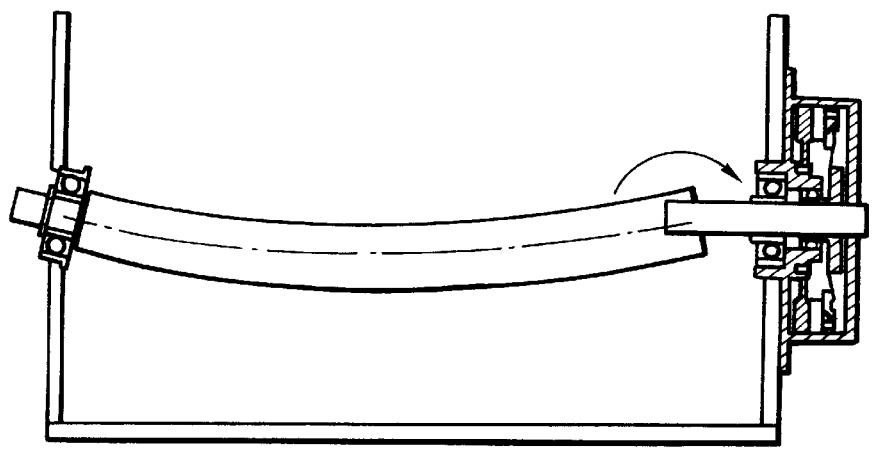
Figure 13C:
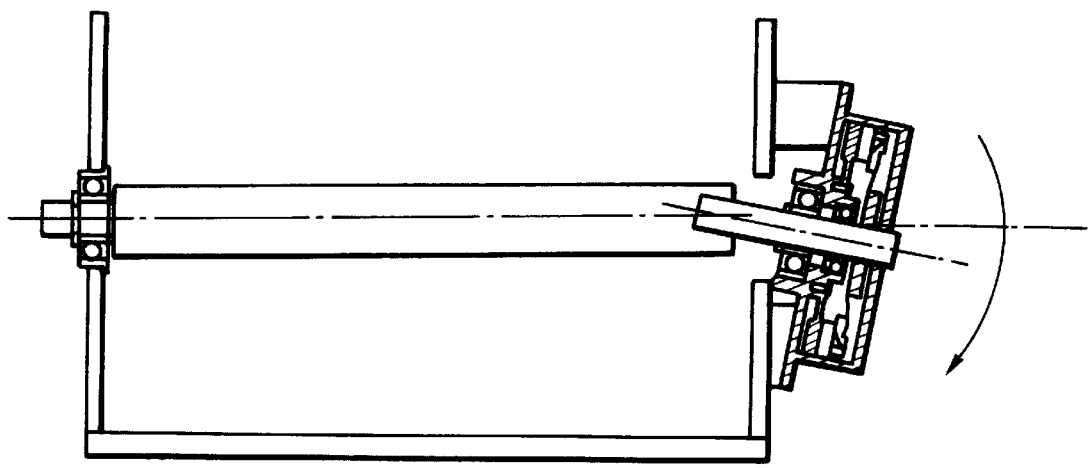

FIGS. 13A to 13C and 14A to 14C are diagrams for explaining the operation of the present embodiment. FIG. 13A is a diagram showing a roller and a motor unit in the case where an inclination occurs in the roller and motor shaft. FIG. 13B is a diagram showing a deformation in the case where the fixing member is not used. FIG. 13C shows an example using the fixing member. As shown in FIG. 13A, when an inclination occurs in the connecting portion of the roller and the motor shaft, if the motor casing and the roller bearing are directly fixed to the device casing, the bending moment acts on the motor shaft in such a direction as to absorb the inclination (FIG. 13B). A pair of ball bearings for supporting the motor shaft receive, as a thrust load, the reactive force of the force which makes the vibration member and the moving member come into pressure contact with each other. Therefore, by receiving a radial load that is caused by the bending moment which is received from the roller, the load torque increases and the life is also shortened. Further, when the motor shaft shakes, the pressurizing spring also shakes. Therefore, the pressure for making the rotor come into pressure contact with the stator changes together with the rotation and a variation occurs in the generated torque.

By fixing the motor to the device attaching portion by using the fixing member which has a high rigidity in the rotating direction and can be easily inclined as shown in FIG. 13C, deformation of each part and the bending moment to the motor shaft are reduced. It is possible to drive at high precision, high rigidity, and high controllability.

Figure 14A:
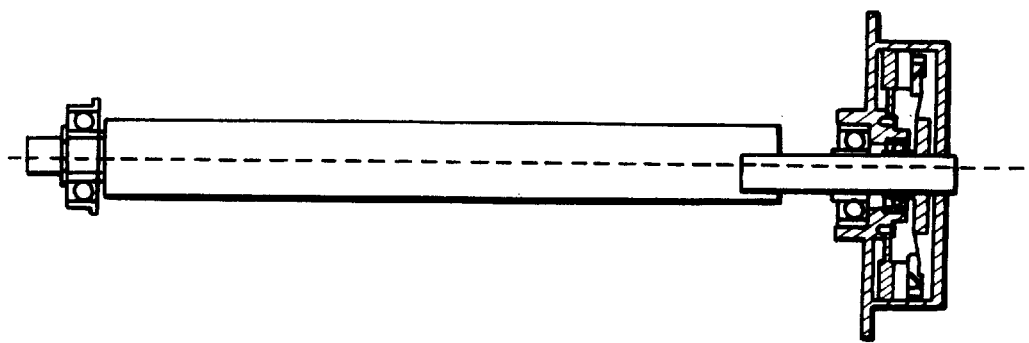
FIGS. 14A, 14B, and 14C are cross sectional views for explaining an effect of the invention.
Figure 14B:
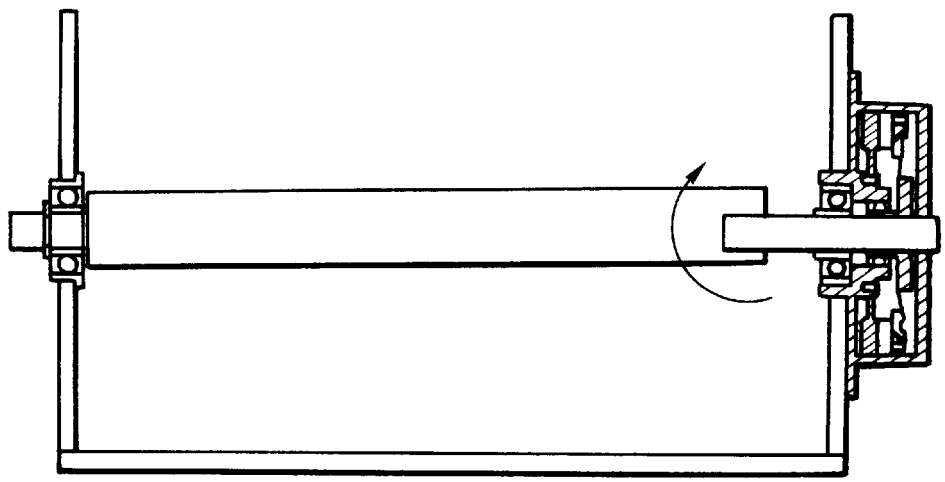
Figure 14C:
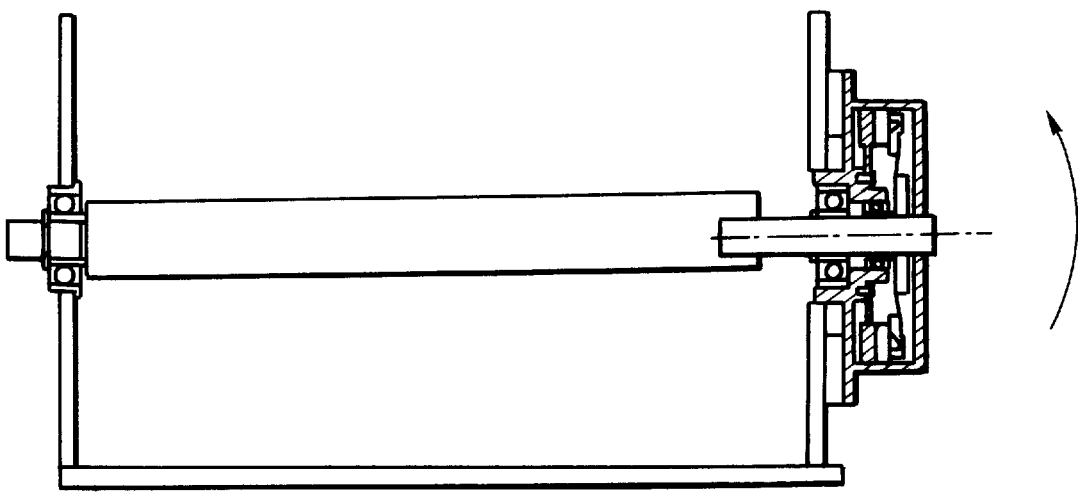
Figure 15A:
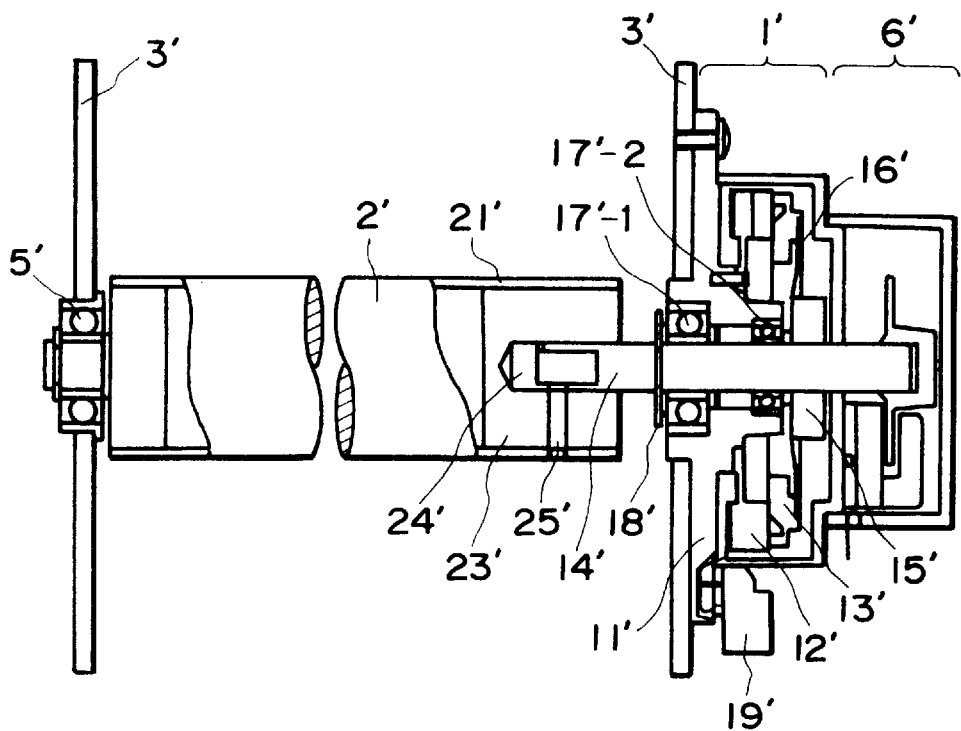
FIGS. 15A and 15B are cross sectional views of a device using a conventional vibration wave motor as a driving source.
Figure 15B:
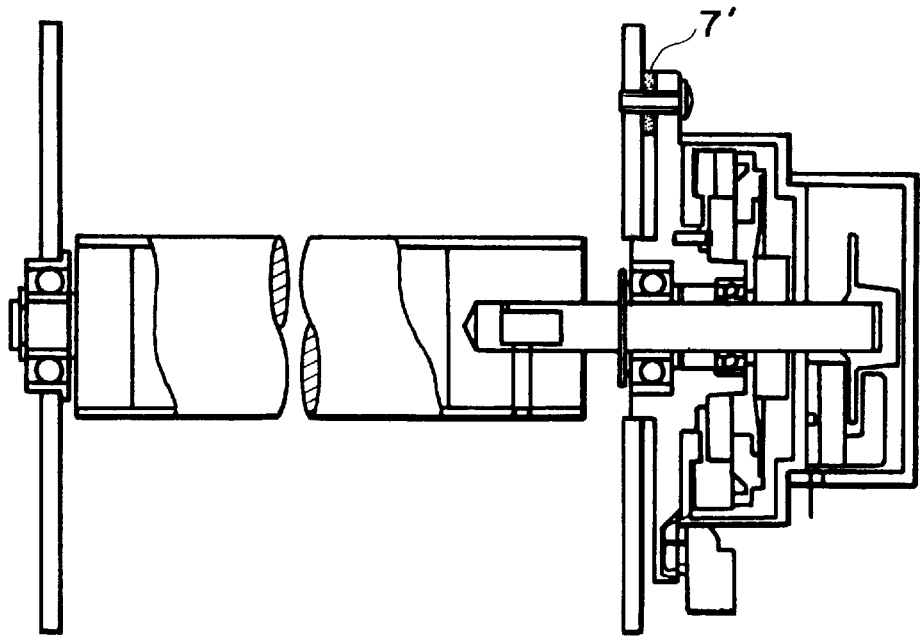

FIGS. 14A to 14C are diagrams showing the operation of the invention in the case where the motor shaft and the roller axial center do not coincide. FIG. 14A is a diagram of a roller and a motor unit. FIG. 14B is a diagram showing a deformation in the case where the fixing member is not used. FIG. 14C shows an example using the fixing member. In a manner similar to the case where an inclination occurs in the roller and the motor shaft, when the motor and the roller bearing are directly fixed to the device attaching portion (FIG. 14B), the bending moment acts on the motor shaft in such a direction as to absorb the inclination. However, by fixing the motor to the device attaching portion using the fixing member as shown in FIG. 14C, the bending moment to the motor can be reduced.

As described above, according to the fifth to ninth embodiments, the vibration wave motor has a fixing member which is fixed to the device to be driven, the fixing member is supported so as to restrict the rotating direction of the motor and to be slightly free for inclination. Thus, the burden on each part due to the coupling error between the driven member and the motor shaft which is caused by the working tolerance and the assembling tolerance in the case of a "direct drive" method or a transfer system of high rigidity can be absorbed by inclination of the motor.

Consequently, the deformation of each member, the reduction of life due to an increase in radial load to the motor bearing, the deterioration of precision due to an increase in load torque, and the variation of torque generated due to a pressure change caused by torque generated due to a pressure change caused by shake of the motor shaft is reduced, and it is possible to drive the device at high precision, with high rigidity and high controllability.

What is claimed is:

1. A vibrating type driving device comprising:
   a vibration member in which vibration is generated;
   a moving member press contactable with said vibration member and rotatable driven by vibration generated in said vibration member;
   an output shaft coupled to said moving member and rotated by rotation of said moving member;
   pressurizing means for press contacting said vibration member and said moving member to each other; and
   a plurality of bearings separately arranged in an axial direction and rotatably supporting said output shaft, each of said plurality of bearings being arranged so as to separately receive a reactive force of pressure applied by said pressurizing means, said reactive force acting in the same direction as the axial direction; and
   an elastic member functionally contactable with at least one of said plurality of bearings so as to distribute the reactive force among said plurality of bearings.

2. A device according to claim 1, wherein the reactive force of pressure applied by said pressurizing means preloads said plurality of bearings.

3. A device according to claim 1, wherein said plurality of bearings are rolling bearings.

4. A device according to claim 3, wherein an inner ring of each of said plurality of rolling bearings is coupled to said output shaft so as to integrally move in an acting direction of the reactive force of pressure applied to said output shaft.

5. A device according to claim 1, wherein said pressurizing means includes a pressurizing member, and each of said plurality of bearings is arranged on one side of said pressurizing member in the axial direction.

6. A device according to claim 5, further comprising a plurality of ring-shaped members fixed to said output shaft, each of said ring-shaped members pressing an inner ring of a respective one of said plurality of bearings in a same direction by the reactive force of pressure applied by said pressurizing means.

7. A device according to claim 6, wherein said elastic member is disposed between two of said plurality of bearings, and at least one of said plurality of bearings receives a pressing force from one of said plurality of ring-shaped members through said elastic member.

8. A device according to claim 5, wherein said pressurizing member is a substantially ring-shaped spring having an outer circumference coupled to a contact portion of said moving member and an inner circumference coupled to a member having a fixed relation with said output shaft.

9. A device according to claim 1, wherein said pressurizing means includes a pressurizing member and at least one of said plurality of bearings is arranged on each side of said pressurizing member in the axial direction.

10. A device according to claim 9, wherein said pressurizing member is a substantially ring-shaped spring having an outer circumference coupled to a contact portion of said moving member and an inner circumference coupled to a member having a fixed relation with said output shaft.

11. A device according to claim 9, further comprising a plurality of ring-shaped members fixed to said output shaft, each of said ring-shaped members pressing an inner ring of a respective one of said plurality of bearings in a same direction by the reactive force of pressure applied by said pressurizing means.

12. A device according to claim 11, wherein said elastic member is disposed between two of said plurality of bearings, and at least one of said plurality of bearings receives a pressing force from one of said plurality of ring-shaped members through said elastic member.

13. A device according to claim 1, wherein said pressurizing means is substantially integrated with said moving member, and comprises a contact portion contactable with said vibration member and a pressure generating portion positioned between said output shaft and said contact portion.

14. A device according to claim 1, wherein said pressurizing means is substantially integrated with said moving member, and comprises a pressure generating portion integrally rotatable with said moving member.

* * * * *

UNITED STATES PATENT AND TRADEMARK OFFICE
CERTIFICATE OF CORRECTION

PATENT NO. : 6,107,723
DATED : August 22, 2000
INVENTOR(S) : Kosuke Fujimoto

It is certified that error appears in the above-identified patent and that said Letters Patent is hereby corrected as shown below:

On the title page,

[57] ABSTRACT:

Line 3, "come" should read --brought--.

Line 4, "rotated," should read --rotated thereby,--.

Line 5, "rotated," should read --rotated thereby,--.

COLUMN 2:

Line 27, "gear," should read --a gear,--.

COLUMN 3:

Line 13, "part" should read --part's--.

COLUMN 6:

Line 54, Close up right margin.

UNITED STATES PATENT AND TRADEMARK OFFICE
CERTIFICATE OF CORRECTION

PATENT NO. : 6,107,723

DATED : August 22, 2000

INVENTOR(S) : Kosuke Fujimoto

It is certified that error appears in the above-identified patent and that said Letters Patent is hereby corrected as shown below:

COLUMN 10:

Line 17, "plate" should read --plate 203--.

COLUMN 13:

Line 23, "rotatable" should read --rotatably--.

Line 35, "and" should be deleted.

Signed and Sealed this

Twenty-ninth Day of May, 2001

NICHOLAS P. GODICI

*Attest:*

*Attesting Officer*     Acting Director of the United States Patent and Trademark Office